United States Patent Office 3,308,135
Patented Mar. 7, 1967

3,308,135
1-DIETHYLAMINO-6-PHTHALIMIDOHEXAN-3-ONE
Alexander Bertus Arnold Jansen, Burnham, and Kenneth Eric Vincent Spencer, Emsworth, England, assignors to American Home Products Corporation, New York, N.Y., a corporation of Delaware
No Drawing. Filed Mar. 1, 1965, Ser. No. 436,372
Claims priority, application Great Britain, Mar. 3, 1964, 9,024/64
1 Claim. (Cl. 260—326)

This invention relates to pharmaceutical compositions containing certain aminoalkylcarbonyl compounds and to methods of preparing them.

γ-Aminobutyric acid occurs in the central nervous system of mammals and is believed to exert a marked effect on the physiological activity of the mammalian brain. The acid itself is of no value as a pharmaceutical for whatever the effect of its administration to the brain might be, direct administration is impracticable as its transference from the blood stream to the brain so as to increase its concentration in the brain is prevented by the blood brain barrier.

In accordance with the invention the γ-aminobutyric acid molecule can be modified to produce compounds which, when introduced into the blood stream of mammals, and in certain cases orally, are carried to the brain and there exert a marked action of the central nervous system. This action shows itself in a variety of ways, depending upon the precise structure of the compound concerned. Many of the compounds are especially interesting pharmacologically because they show intense activity in the central nervous system, unaccompanied by peripheral effects, and in certain cases the compound show a low toxicity.

Many of the compounds are sedatives or hypnotics and some potentiate the action of other sedative pharmaceutical materials, for instance the barbiturates.

Thus, the invention provides a pharmaceutical composition containing, in association with a pharmaceutically acceptable carrier, a cyclic acylaminoalkylketone having the formula:

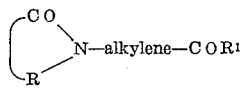

in which the group

is a cyclic acylamino group, where —R— is an organic residue, the alkylene residue can have no, one or two lower alkyl groups only on the carbon atom next to the nitrogen atom and has a chain of 3 carbon atoms between the nitrogen atom and the group —COR$^1$, and R$^1$ is an alkyl or aryl group containing up to 7 carbon atoms.

The invention also provides a process of producing such a pharmaceutical composition wherein a cyclic acylaminoalkylketone as aforesaid is put into medically acceptable form, e.g., by mixing with a pharmaceutically acceptable carrier.

Certain of the cyclic acylaminoalkylketones are novel and the invention therefore provides such compounds, that is, cyclic acylaminoalkylketones as aforementioned in which, when the group

is phthalimido, R$^1$ is an alkyl group containing at least two carbon atoms or an aryl group other than phenyl.

The terms alkyl and aryl group used herein are to be understood to include substituted alkyl and substituted aryl groups which are unsaturated. Thus, examples of alkyl groups are methyl, ethyl, propenyl, but-2-enyl, chloropentyl, cycloalkyl, e.g., cyclohexyl and aralkyl groups, e.g., benzyl. Examples of aryl groups are phenyl, tolyl and chlorophenyl groups.

The aforementioned compounds are to be considered to include their salts when such are formed.

The aforementioned cyclic acylaminoalkylketones are preferably those in which —R— is an acyl carbonyl group, for instance as in the case of phthalimidoalkylketones. The grouping —R— may however be, for instance, —CH$_2$— or —SO$_2$— as in phthalimidinoalkylketones and saccharimido alkylketones. (For brevity the residue

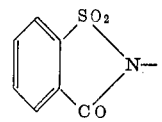

is referred to as "saccharimido").

The group

can be a phthalimido or saccharimido group which may be substituted, for instance at any of the positions of the benzene ring thereof by one or more alkyl, alkoxy, nitro, amine or halogen groups. It is preferred that substitution is by one or two lower alkyl and/or lower alkoxy groups; also it is preferably at the 3 and 6 positions of the benzene ring.

It is preferred, in order to obtain the higher central nervous system activities, that of the substituents next to the nitrogen atom there is only one or no substituents, it is preferred that if such a substituent is present that it is an alkyl group and particularly preferred that it is an unsubstituted lower alkyl group. For highest activities it is preferred that this group is a methyl or ethyl group.

The alkylene residue may contain a double bond between the

and —COR$^1$ group if desired.

In general the cyclic acylaminoalkylketone of this invention can be prepared without difficulty by the application of standard reactions to appropriate intermediates.

A pharmaceutical composition of the invention comprises an acylaminoalkylketone in association with a pharmaceutically acceptable carrier, which can be either solid or liquid. Solid form compositions include powders, tablets, dispersible granules, capsules, cachets, and suppositories. A solid carrier can be one or more substances which may also act as flavouring agents, lubricants, solubilizers, suspending agents, binders, or tablet-disintegrating agents: it can also be an encapsulating material. In powders the carrier is a finely divided solid which is in admixture with the finely divided active ingredient. In tablets the active ingredient is mixed with carrier having the necessary binding properties in suitable proportions and compacted in the shape and size desired. The powders and tablets preferably contain from 5 to 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly, cachets are included.

Liquid form compositions include solutions, suspensions, emulsions, syrups and elixirs. The active ingredient can be dissolved or suspended in a pharmaceutically acceptable liquid carrier, such as water, an organic solvent or a mixture of both. Preferably a liquid carrier is one suitable for parenteral injection so that the compositions can be made a sterile one suitable for injection. Where the active ingredient is sufficiently soluble it can be dissolved in normal saline as a carrier: if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely divided active ingredient in aqueous starch or sodium carboxymethyl cellulose solution, or in a suitable oil, for instance arachis oil. Liquid pharmaceutical compositions which are sterile solutions or suspensions can be utilized by intramuscular, intraperitoneal or subcutaneous injection. In many instances a compound is orally active and can be administered orally either in liquid or solid composition form.

Preferably the pharmaceutical composition is in unit dosage form. In such form, the composition is subdivided in unit doses containing appropriate quantities of the active ingredient: the unit dosage form can be a packaged composition, the package containing discrete quantities of composition, for example packeted powders or vials or ampoules. The unit dosage form can be a capsule, cachet or tablet itself, or it can be the appropriate number of any of these in packaged form. The quantity of active ingredient in a unit dose of composition may be varied or adjusted from 5 mg. or less to 5 g. or more, according to the particular need and the activity of the active ingredient. The invention also includes the compounds in the absence of carrier where the compounds are in unit dosage form.

The invention is illustrated by the following examples, in which all temperatures are in ° C. The pharmaceutical compositions referred to in the examples were administered by intraperitoneal injection. They had concentrations of the active ingredient in the range 12.7 to 400 mg./ml. Thus, doses in the range 12.7–400 mg./kg. were administered to mice by the use of 0.01 ml. composition per gram of body weight.

Example 1

1-phthalimido-4-pentanone was prepared by the method of B. R. Baker et al., J. Org. Chem., 17, 66 (1952) as a colourless oil, B.P. 168–170/0.2 mm., which solidified M.P. 57–60°.

A pharmaceutical composition containing this ketone was made up by suspension in 1% aqueous carboxymethyl cellulose solution. It showed moderate sedative activity in mice near the lethal dose.

Example 2

γ-Phthalimidobutyrophenone was prepared as follows:
A mixture of γ-phthalimidobutyryl chloride (2 g.) auminum chloride (3 g.) and benzene (10 ml.) was heated on a steam bath for 1 hour. After decomposition of the resulting mixture with water and hydrochloric acid, ethyl acetate was added to dissolve all solid. The organic layer was washed successively with dilute hydrochloric acid, water, sodium hydroxide solution and water, dried and evaporated, leaving a crystalline residue (2 g.) M.P. 132–5°. Recrystallization from ethanol gave colourless needles (1.6 g.) M.P. 135–6°.

A pharmaceutical composition containing this ketone was made up with propylene glycol. It showed mild sedative activity in mice.

Example 3

1-(p-tolyl)-4-N-phthalimidobutan-1-one was prepared as follows:
Anhydrous aluminum chloride (8.0 g.) was added portionwise over 10 min. with shaking to a solution of, phthalimidobutyryl chloride (from 7.6 g. acid) in dry toluene (40 ml.). The solution was heated on a steam bath for 1 hour, and then poured into iced 2 N hydrochloric acid. The toluene layer was shaken with water, dried and the solvent removed under reduced pressure. On being triturated with isopropyl ether the residual oil yielded a solid which was collected and recrystallized twice from aqueous ethanol giving pale yellow needles (2.4 g. M.P. 112–114°). Found: C, 74.8; H, 5.7; N, 4.55. $C_{19}H_{17}NO_3$ requires C, 74.25; H, 5.6; N, 4.6%.

A pharmaceutical composition containing this ketone was made up with 50% aqueous propylene glycol. It showed moderate sedative activity in mice.

Example 4

1-(p-chlorophenyl)-4-N-phthalimidobutan-1-one was prepared as follows:
Anhydrous aluminum chloride (8 g.) was added in small portions over 10 min. to a mixture of phthalimidobutyryl chloride (from 7.6 g. acid) and chlorobenzene (3.32 ml.). The reaction mixture was heated on a steam bath for 2 hours and then poured into iced concentrated hydrochloric acid. The mixture was extracted thoroughly with ethyl acetate and the combined extracts were dried and evaporated under reduced pressure. Trituration of the residual gum with ethanol yielded a solid which was collected (2.8 g.) and recrystallized from aqueous ethanol yielding cream coloured needles (1.6 g.) M.P. 117.5–121°. A portion was recrystallized a second time for analysis M.P. 120.5–122°. Found: C, 66.0; H, 4.3; N, 4.1; Cl, 10.6. $C_{18}H_{14}ClNO_3$ requires C, 66.1; H, 4.3; N, 4.3; Cl, 10.8%.

A pharmaceutical composition containing this ketone was made up with 50% aqueous propylene glycol. It showed moderate sedative activity in mice.

Example 5

1-(p-methoxyphenyl)-4-N-phthalimidibutan-1-one was prepared as follows:
Anisole (2.2 ml.) in dry carbon disulphide (5 ml.) was added dropwise to a mixture of phthalimidobutyryl chloride (from 4.6 g. acid) anhydrous aluminum chloride (4 g.) and dry carbon disulphide (10 ml.). The reaction mixture was refluxed for 1 hour on a steam bath and then poured into iced concentrated hydrochloric acid. The mixture was extracted thoroughly with ethyl acetate and, after drying, the combined extracts were evaporated under reduced pressure. The residual oil, on trituration with ethyl acetate gave a solid which was collected (2.5 g.) and recrystallized twice from aqueous ethanol yielding cream coloured needles (1.8 g.) M.P. 116–118°. A portion was recrystallized a third time for analysis M.P. 116.5–118°. Found: C, 70.5; H, 5.1; N, 4.50. $C_{19}H_{17}NO_4$ requires C, 70.6; H, 5.3; N, 4.3.

A pharmaceutical composition containing this ketone was made up with 20% aqueous propylene glycol. It showed moderate sedative activity in mice.

Example 6

1-(p-hydroxyphenyl)-4-N-phthalimidobutan-1-one was prepared as follows:
A mixture of phthalimidobutyryl phenate (4.5 g.), anhydrous aluminum chloride (2.16 g.), and nitrobenzene (20 ml.) was stirred for 5 hours at 65–70°. The solution was poured into iced 2 N hydrochloric acid. On the addition of ether a grey solid (2.6 g.) was precipitated which was collected and recrystallized from aqueous ethanol, giving 1-(p-hydroxyphenyl)-4-N-phthalimidobutan-1-one.

(1.6 g.) M.P. 183–5°. Found: C, 69.75; H, 5.0; N, 4.6. $C_{18}H_{15}NO_4$ requires C, 69.9; H, 4.9; N, 4.5%.

A pharmaceutical composition containing this ketone was made up with 50% propylene glycol. It showed mild sedative activity in mice.

*Example 7*

1-(2-thienyl)-4-N-phthalimidobutan-1-one was prepared as follows:

A solution of phthalimidobutyryl chloride (from 8.7 g. acid) and thiophene (3 g.) in dry carbon disulphide (7 ml.) was added dropwise over 2 hours to a stirred suspension of anhydrous aluminum chloride (5 g.) in dry carbon disulphide (10 ml.) kept at room temperature. The reaction mixture was stirred for 90 min. and then left to stand overnight. It was then refluxed for 3 hours, poured into ice-water, and the mixture thoroughly extracted with ether. The dried extract was evaporated under reduced pressure leaving a thick yellow oil which was solidified on trituration with ether. The crude solid (2.9 g.) was collected and crystallized from isopropyl ether, yielding pale yellow needles (1.3 g.) M.P. 118.5–121.5°. A portion was recrystallized a second time for analysis M.P. 118–120.5°. Found: C, 63.9; H, 4.4; N, 4.7; S, 10.75. $C_{15}H_{13}NO_3S$ requires C, 64.2; H, 4.4; N, 4.7; S, 10.7%.

A pharmaceutical composition containing this ketone was made up with 50% propylene glycol. It showed moderate sedative activity in mice.

*Example 8*

1-(2-furyl)-4-N-phthalimidobutan-1-one was prepared as follows:

A mixture of phthalimidobutyryl chloride (from 6.9 g. acid), furan (2.16 ml.) and dry carbon disulphide (20 ml.) was added over 1 hour to a stirred suspension of anhydrous aluminum chloride (4.8 g.) in dry carbon disulphide (25 ml.) kept at room temperature. The reaction mixture was stirred for a further 30 min. then refluxed for 1 hour and poured into ice-water. Thorough extraction of the resulting mixture with ether, followed by evaporation of the dried extracts, under reduced pressure, gave a residue, trituration of which with a mixture of isopropyl ether and ethanol left a solid (4.7 g.). Two recrystallizations from 95% ethanol gave pale brown needles of 1-(2-furyl)-4-N-phthalimidobutan-1-one (1.2 g.) M.P. 121–124°. A portion, recrystallized a third time for analysis, had M.P. 122.5–124.5°. Found: C, 67; H, 4.7; N, 5.2. $C_{16}H_{13}NO_4$ requires C, 67.8; H, 4.6; N, 4.95%.

A pharmaceutical composition containing the ketone was made up with 50% aqueous propylene glycol. It showed moderate sedative activity in mice.

*Example 9*

5-phthalimido-2-oxo-1-phenylpentane was prepared as follows:

Concentrated sulphuric acid (1 drop) was added to a mixture of phenylmalonic acid (1.8 g.), dihydropyran (2.7 ml.) and benzene (10 ml.) and the exothermic reaction which ensued was controlled by water cooling. The mixture was shaken for ½ hour after all solid had dissolved and then washed with sodium carbonate solution and dried. A little of the benzene was removed under reduced pressure to ensure dryness and then sodium hydride (50% 0.5 g.) was added, followed after ½ hour by γ-phthalimidobutyryl chloride (from 2.53 g. of the acid) in dry benzene (10 ml.). After several hours water was added and the benzene layer was separated and evaporated under reduced pressure. The residue was refluxed in ethanol (10 ml.) and dilute hydrochloride acid (10 ml.) for 2 hours and the product was isolated in ether after dilution with water. Evaporation of the ethereal extract which had been thoroughly washed with dilute sodium hydroxide gave an oil (2.6 g.). After trituration with petrol (60–80°) to remove mineral oil, the product partially crystallized on long standing. The crystals were sucked as dry as possible from the contaminating oil and were then triturated with isopropyl ether giving material (0.46 g.) M.P. 74.77°. Recrystallization from benzene-isopropyl ether gave nearly colourless prisms. (0.3 g.) M.P. 77–78°. Found: C, 74.5; H, 5.7; N, 4.7. $C_{19}H_{17}O_3N$ requires C, 74.25; H, 5.6; N, 4.6%.

A pharmaceutical composition containing the ketone was made up with 50% aqueous propylene glycol. It showed moderate sedative activity in mice.

*Example 10*

1-phthalimido-4-oxononane was prepared as follows:

Concentrated sulphuric acid (1 drop) was added with shaking to a mixture of butylmalonic acid (8.0 g.), dihydropyran (13.5 ml.) and dry benzene (50 ml.) with slight cooling in an ice bath. Shaking at room temperature was continued for ½ hour after all the solid had dissolved and the solution was then washed with 2 N sodium carbonate solution. The dried benzene layer was concentrated under reduced pressure to about half its volume (temp. 45°) and sodium hydride (2.0 g.) was added. After ½ hour phthelimidobutyryl chloride (from 5 g. of the acid), in dry benzene (25 ml.) was added to the solution and the resulting thick gel was left to stand 1 hour at room temperature. A little water was carefully added to the mixture and the benzene layer separated and evaporated under reduced pressure. The residual oil was refluxed in ethanol (25 ml.) and 2 N hydrochloric acid (25 ml.) for 2 hours. After dilution with water the aqueous solution was thoroughly extracted with ether evaporation of which left a brown oil (10 g.).

The residual oil (10 g.), containing the ketone was refluxed for 1 hour with a mixture of Girard T reagent (5 g.), ethyl alcohol (45 ml.) and acetic acid (5 ml.). After cooling, the solution was diluted with water (450 ml.) containing sodium hydroxide (3.15 g.), and washed with ether. The aqueous layer was acidified with 2 N hydrochloric acid (105 ml.) and thoroughly extracted with ether. The dried brown residual oil was triturated with petroleum ether (40–60°) to give a pale yellow solid (1.5 g.) M.P. 38–42°. Recrystallization from isopropyl ether gave colourless needles (1.4 g.) M.P. 40–42.5°. A portion was recrystallized a second time for analysis, M.P. 41–42.5°. Found: C, 70.9; H, 7.4; N, 5.0.

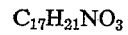

$C_{17}H_{21}NO_3$ requires C, 71.05; H, 7.4; N, 4.9%.

A pharmaceutical composition containing this ketone was made up with 50% aqueous propylene glycol. It showed mild sedative activity in mice.

*Example 11*

1-phthalimido-4-oxo-heptane was prepared as follows:

Concentrated sulphuric acid (1 drop) was added to a mixture of ethyl malonic acid (10.4 g.), dihydropyran (21.6 ml.) and dry benzene (80 ml.). By following the procedure of Example 10, crude 1-phthalimido-4-oxo-heptane (2.0 g.) was obtained. Recrystallization from isopropyl ether yielded colourless needles (1.8 g.) M.P. 64–66°. A portion was recrystallized a second time for analysis M.P. 65–66.5°. Found: C, 69.3; H, 6.7; N, 5.2. $C_{15}H_{17}NO_3$ requires C, 69.5; H, 6.6; N, 5.4%.

A pharmaceutical composition containing the ketone was made up with 50% aqueous propylene glycol. It showed strong sedative activity and potentiated the action of hexabarbitone in mice.

*Example 12*

1-diethylamino-6-phthalimidohexan-3-one was prepared as follows:

Acetylene was bubbled for 1 hour through a freshly prepared suspension of sodamide (from 28 g. sodium) in liquid ammonia (1 lit.), kept at −40°. 1-chloro-3-bromopropane (157 g.) was added over 30 min. with stirring, and the temperature kept at −35°. After a further 2 hour stirring at this temperature, the mixture was treated with ammonium chloride (20 g.) and left to stand at room temperature overnight. Water (175 ml.) was added to the brown solid residue and the cooled mixture was acidified with concentrated hydrochloric acid. After filtration through glass wool the mixture was extracted with either (3×75 ml.), to yield after fractional distillation 5-chloropent-1-yne as a colourless liquid (17.9 g.) B.P. 118–122° $n_D^{22}$ 1.4519.

A mixture of 5-chloropent-1-yne (1.1 g.), potassium phthalimide (1.85 g.) potassium iodide (1.7 g.) and dimethylformamide potassium (5 ml.) was heated on a steam bath for 4 hours. Much of the solvent was removed under reduced pressure and water was added to the residue which soon crystallized. After trituration with a little alcohol the residue was dissolved in the minimum amount of benzene and petrol was added until a precipitate formed. The solid was removed by filtration and the filtrate was evaporated to dryness. The residue was crystallized from ethanol, affording colourless prisms of 5-phthalimidopent-1-yne (1.1 g.) M.P. 83–85°. Found: C, 72.7; H, 5.2; N, 6.55. $C_{13}H_{11}O_2O$ requires C, 73.2; H, 5.2; N, 6.5%.

A mixture of phthalimidopent-1-yne (12 g.) paraformaldehyde (1.62 g.), formaldehyde (6.4 ml.), acetic acid (2.58 ml.), dioxan (25 ml.), water (2.5 ml.), cuprous chloride (0.142 g.) and diethylamine (5.8 g.) was kept at 85° overnight under nitrogen. The solution was made alkaline with 2 N sodium hydroxide and extracted with ether. The basic product was extracted from the ether into hydrochloric acid and again back into ether after basification of the aqueous phase with 2 N sodium hydroxide. Evaporation of the dried extract under reduced pressure left a pale brown oil, treatment of which with ethereal hydrogen chloride gave colourless needles 1-diethylamino-6-phthalimidohex-2-yne hydrochloride (6.2 g.) M.P. 148–152° raised to M.P. 150–152° by a further recrystallization. Found: C, 63.7; H, 7.0; N, 8.05.

$$C_{18}H_{23}ClN_2O_2$$

requires C, 64.4; H, 6.9; N, 8.9; N, 8.35%.

1-diethylamino-6-phthalimidohex-2-yne obtained from the hydrochloride (1.5 g.) was refluxed with mercuric sulphate (0.3 g.) concentrated sulphuric acid (0.22 ml.), and water (2.2 ml.) for 1½ hours under nitrogen. Hydrogen sulphide was passed into the cooled mixture and the precipitated mercuric sulphide was removed by filtration. The filtrate was neutralized with sodium bicarbonate solution and thoroughly extracted with chloroform. Evaporation of the solvent under reduced pressure left an oil (1.5 g.) which on treatment with ethereal hydrogen chloride yielded a crystalline solid. Recrystallization from ethanol/isopropyl ether gave colourless needles of 1-diethylamino-6-phthalimidohexan-3-one hydrochloride (0.73 g.) M.P. 149–150°. Found: C, 60.7; H,7.0; N, 7.3. $C_{18}H_{25}ClN_2O_3$ requires C, 61.3; H, 7.1; N, 7.9%.

A pharmaceutical composition containing the hydrochloride of this base was made up with sterile water. It showed mild sedative activity in mice.

What is claimed:

1-diethylamino-6-phthalimidohexan-3-one.

References Cited by the Examiner
UNITED STATES PATENTS

| | | | |
|---|---|---|---|
| 3,074,960 | 1/1963 | Archer | 260—326 X |
| 3,084,201 | 4/1963 | Hartman | 260—332.3 X |
| 3,086,021 | 4/1963 | Biel | 260—332.3 X |

ALEX MAZEL, *Primary Examiner.*

MARY U. O'BRIEN, *Assistant Examiner*